United States Patent [19]

Nelson

[11] Patent Number: 4,588,262
[45] Date of Patent: May 13, 1986

[54] MULTI-LASER SWITCH
[75] Inventor: Roy D. Nelson, Lafayette, Colo.
[73] Assignee: Ball Corporation, Muncie, Ind.
[21] Appl. No.: 637,806
[22] Filed: Aug. 6, 1984
[51] Int. Cl.$^4$ .............................................. G02F 5/30
[52] U.S. Cl. ................................................... 350/401
[58] Field of Search ........................ 350/400, 401, 172

[56] References Cited

U.S. PATENT DOCUMENTS 3,346,319 10/1967 Billings ................................. 350/172
3,512,868 5/1970 Gorkiewicz et al. ............... 350/400
3,825,316 7/1975 Amodei ................................ 350/401

OTHER PUBLICATIONS

Refermat, Stanley, "Variable Ratio Beam Splitters for High Energy Laser Systems", SPIE, vol. 140, pp. 95–100 (1978).

Primary Examiner—Bruce Y. Arnold
Attorney, Agent, or Firm—Gilbert E. Alberding

[57] ABSTRACT

A laser switching system has at least two relatively fixed lasers, a primary and a standby, arranged to selectively transmit linearly polarized laser light along an optical path. The switching system also includes at least one polarized beam splitter disposed in the optical path. For example, the first one may be used for passing through laser light from one of the lasers and for reflecting light from the other laser along the optical path. Subsequent polarized beam splitters may be associated with each further laser to also reflectively direct its output along the optical path and to pass properly polarized laser light emanating from upstream along the optical path. Half-wave plates are selectively movable into and out of the optical path subsequent to the polarized beam splitters depending on which laser is transmitting light along the optical path. The half-wave plates are the only required moving components of the assembled switching system and are used to properly align the linearly polarized laser output(s) to permit passage through subsequent polarized beam splitters or to properly orient the final linearly polarized output of the system.

15 Claims, 9 Drawing Figures

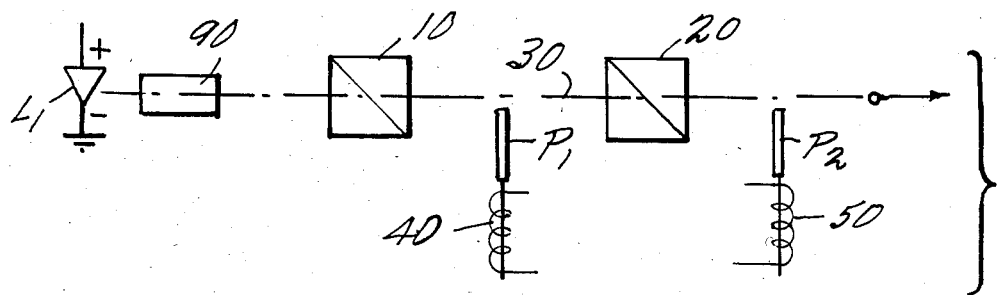
F I G. 4a
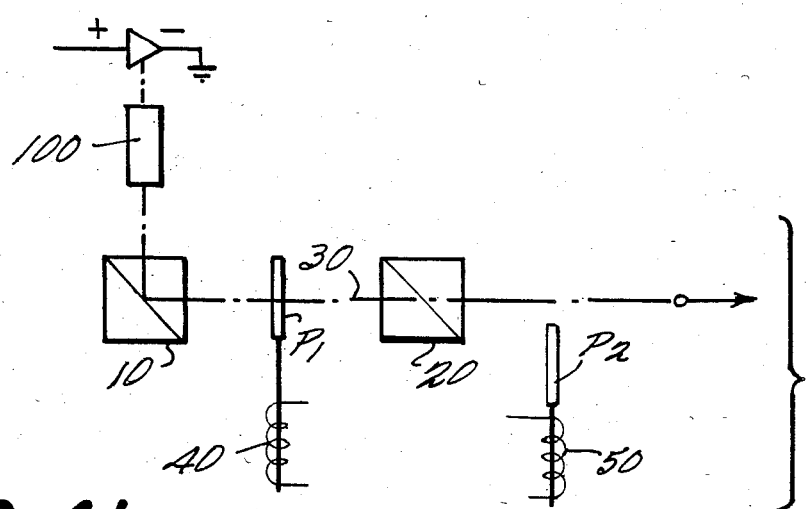
F I G. 4b
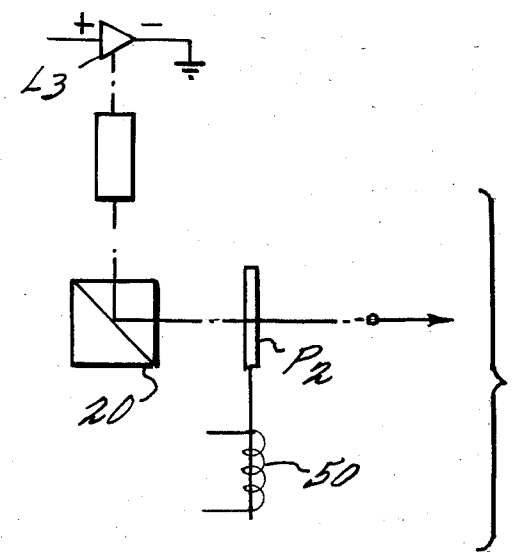
F I G. 4c

MULTI-LASER SWITCH

FIELD OF THE INVENTION

The invention is directed to a multi-laser switch system for use in a polarized laser communication system. More specifically, the invention comprises a system in which the polarized output of any laser of the system can be switched into a single polarized optical output path of a given system (e.g. an optical communication channel).

BACKGROUND OF THE INVENTION

In laser communications systems, for example, there is often a need for the system to be capable of switching between a number of redundant or standby transmitter lasers in order to improve overall system reliability (especially if the system is to be deployed in a remote space environment such as an earth satellite). For example, if the primary laser fails, then the system must be able to switch to a standby laser in order to maintain the integrity of the communication system. Prior art systems have sometimes used movable fiber optic light conductors and/or mechanical solenoids to switch redundant lasers into the system if the primary laser fails. For example, one type of system slides/rotates individual lasers into the optical path. Another system switches optical fibers between lasers. One drawback with these prior systems is an inherent additional power loss upon laser-to-fiber and fiber-to-fiber coupling resulting from slight relative misalignments of the movable redundant or standby components. Thus, an ideal switching system would have no moving parts.

SUMMARY OF THE INVENTION

The invention provides a system for switching one of plural laser output beams into a single linearly polarized system output path without requiring any critically precise mechanical movements. No precise mechanical alignments are required once the system components have been initially aligned and secured. Furthermore, there is very little power loss due to the linearly polarized nature of the laser diode outputs and the use of beam directing devices or polarizing beam splitters (PBS).

In operation, the overall system may typically sense a drop in optical output power of a particular laser. If so, then a redundant or standby laser may be brought on line merely by electrically activating the new laser and by translating a beam rotating device or half-wave plate into or out of the system optical path. The half-wave plates are each rotationally fixed in a desired relative rotational position during initial alignment, during manufacture or the like. Thereafter, only translational motion of the half-wave plates is needed or permitted and critically precise translational motion is not required—so long as the half-wave plate is translated sufficiently to either (1) fully intercept the laser beam or (2) not intercept the laser beam. The purpose and function of such translatable half-wave plates is to allow the desired linearly polarized laser beams to be transmitted by one or more PBS and/or to maintain the desired constant linearly polarized orientation of the final output beam.

Accordingly, the laser switching system of the present invention comprises at least primary and secondary lasers arranged to transmit linearly polarized laser light along a single optical path. One or more PBS is disposed in the single optical path in order to transmit or reflect the linearly polarized laser light received from the lasers depending upon the lasers orientation or polarization with regard to the PBS. Depending upon which laser is activated, a particular combination of one or more half-wave plates also may be required to allow transmission of a properly polarized laser beam along the single linearly polarized optical output path. The half-wave plates are moved into or out of operational position depending upon which laser is activated.

Accordingly, one feature of the present invention is that the desired laser source switching function is achieved while the only moving component, the half-wave plate, is alignment sensitive only in rotation and not with respect to the required translational motion. Thus, the rotational orientation of this element (its only critical orientation) can be initially aligned and secured during set-up, thereby substantially reducing the alignment sensitivity of the system during operation when the half-wave plate is simply translated into or out of its active position.

BRIEF DESCRIPTION OF THE DRAWINGS

FIGS. 4(a)–4(c) are explanatory diagrams for one operating mode of the FIG. 1 embodiment.

DETAILED DESCRIPTION OF THE PREFERRED EXEMPLARY EMBODIMENTS

Figure 1:
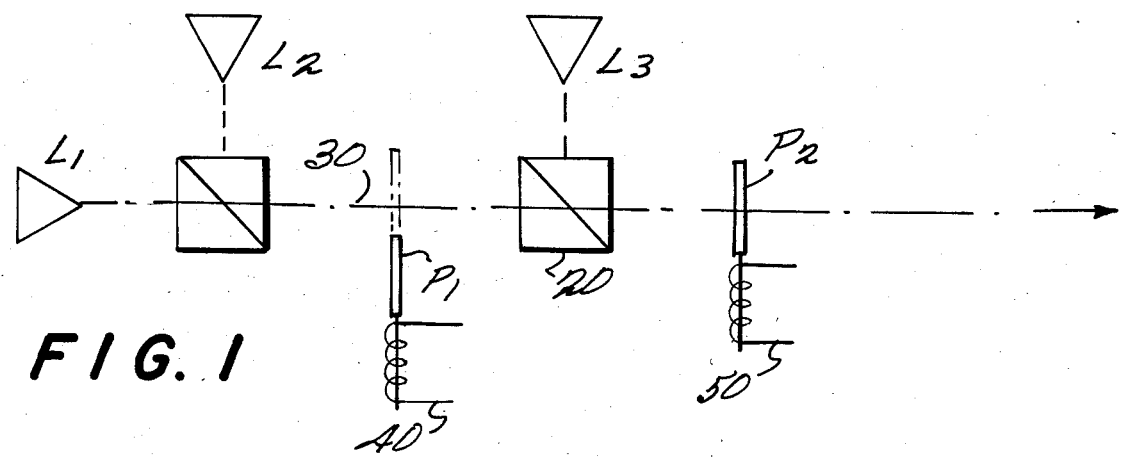
FIG. 1 is a block diagram of one exemplary embodiment of the invention.

FIG. 1 depicts an exemplary embodiment of the present invention in block diagram form including linearly polarized lasers L1, L2 and L3. The lasers may be conventional types and are readily available from numerous vendors such as RCA, Hitachi, Mitsubishi Electronics, NEC Electronics and AEF Telefunken. In addition, two polarizing beam splitters (PBS) 10 and 20 are positioned along optical path 30. The polarizing beam splitters are the type which, for example, will allow a vertically polarized light beam to pass therethrough substantially unchanged while reflecting a horizontally polarized light beam. It should be noted that throughout the specification the terms vertically polarized and horizontally polarized are used, although these terms will have little meaning if the switching system is deployed in space. The terms are used to explain the spatial relationships between the components of the system and it should be recognized that if the system were to be deployed on earth it could be rotated to a particular position at which the terms would have their conventional meanings. The PBSs may also be of conventional known types and are available from vendors such as Karl Lambrecht, Continental Optics, Spectra Physics and CVI.

A half-wave plate P1 is shown retracted from the optical path 30 and a half-wave plate P2 is shown extended into the optical path 30. Laser L1 is spatially oriented so that vertically polarized light is outputted to enter PBS 10 and, therefore, is freely transmitted therethrough. On the other hand, laser L2 is spatially oriented to output horizontally polarized light which enters PBS 10 and is accordingly reflected out along the optical path 30. The half-wave plate P1 is in its retracted state as shown in FIG. 1 whenever the solenoid 40 is de-energized. The dashed lines above the plate P1 indicate its extended position. The half-wave plate P2 is shown in its extended position in which it is in the optical path 30. It is in this position because it is assumed that solenoid 50 has been energized from an external source (not shown). The half-wave plates are used to spatially rotate horizontally polarized light 90° such that it becomes vertically polarized as required to pass through any subsequent PBS or as desired for the system output. Half-wave plates are also well known conventional components which are available from commercial vendors such as Karl Lambrecht, Cleveland Crystals and Tropel.

Figure 2:
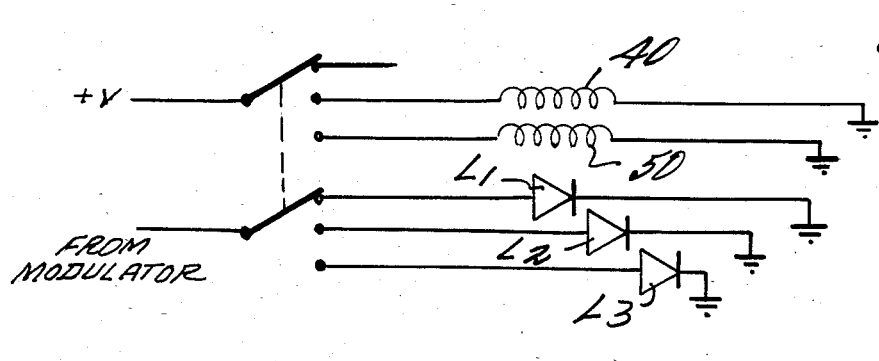
FIG. 2 is a schematic diagram showing one exemplary selective actuation means for the lasers and solenoids of FIG. 1.

FIG. 2 is a electrical schematic showing the functional relationship between the energized laser and the energized solenoid for extending a particular half-wave plate into the optical path. For example, a ganged switch 60 is shown to have three positions, namely, (1) a first position in which laser L1 is energized through contact a' from a modulator (not shown) and in which neither of solenoids 40 and 50 are energized through contact a, (2) a second position in which laser L2 is energized through contact b' from the aforementioned modulator and in which solenoid 40 is also energized through contact b from a power source +V (not shown), and (3) a third position in which laser L3 is energized through contact c' from the modulator and the solenoid 50 is also energized through the contact c from the power source +V.

The operation of the laser communication system shown in FIG. 1 and having a ganged switch such as that shown in FIG. 2 will now be described with reference to FIGS. 4(a)-4(c).

In FIG. 4(a) the condition of the system is shown when switch 60 is in its first position. Accordingly, neither of solenoids 40 and 50 are energized and half-wave plates P1 and P2 are both retracted out of the optical path 30. In addition, laser L1 is energized from the modulator and accordingly vertically polarized light is output from the laser typically through a collimating means or beam shaping optics 90. For clarity and ease of description, the collimating means have been omitted from FIG. 1, however, they are merely conventional collimating optics and are readily available from vendors such as Melles Griot, Fujinon, GTE Electronics, NEC Electronics and AEF Telefunken. Assuming, for example, that laser L1 output is vertically polarized and that PBS 10 and PBS 20 are the type which transmit vertically polarized light, the output from laser L1 will be freely transmitted along optical path 30 passing through PBS 10 and PBS 20 to the output of the FIG. 1 switching system.

Should laser L1 fail, then the system may be automatically switched to activate laser L2 by placing ganged switch 60 into its second position where solenoid 40 and laser L2 are energized. FIG. 4b illustrates this operating condition of the system. Here, horizontally polarized output from laser L2 is emitted and passed through collimating means 100 to PBS 10 where it will be efficiently reflected. Because laser L2 is oriented orthogonally to laser L1, its output is polarized in a horizontal direction and, after being reflected by PBS 10, the L2 output will still be polarized in a horizontal direction. However, when the horizontally polarized L2 output reflected from PBS 10 passes through half-wave plate P1, it is spatially rotated by 90° and output as vertically polarized light. The vertically polarized light emitted from half-wave plate P1 then passes to PBS 20 which freely transmits it to the system output. Thus, when laser L2 is energized and half-wave plate P1 is extended into operative position, a vertically polarized light output is still provided.

A third system operating condition is shown in FIG. 4(c). Should laser L2 subsequently fail, then laser L3 may be energized by placing ganged switch 60 into its third position in which solenoid 50 and laser L3 are energized. In this case, horizontally polarized light output from laser L3 is passed through collimating means 110 and then to PBS 20 where it is reflected along the optical path 30. Because solenoid 50 is energized, half-wave plate P2 is extended into optical path 30 so that reflected L3 laser light from PBS 20 is rotated by P2 to become vertically polarized before being output from the system.

Figure 5A:
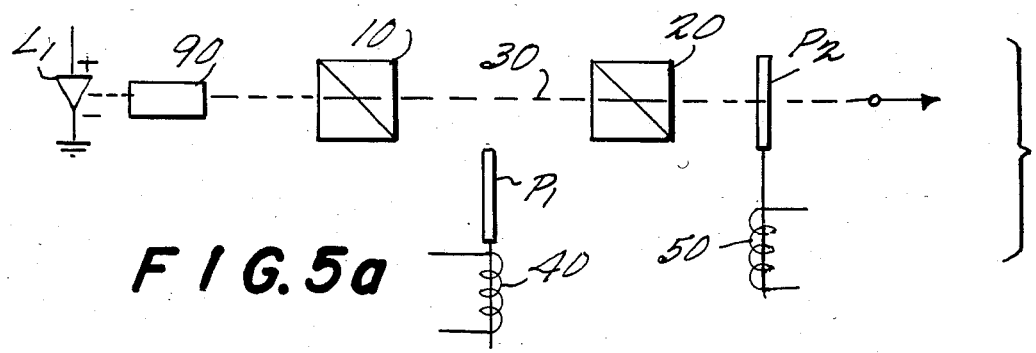
FIGS. 5(a)–5(c) are explanatory diagrams for a second operating mode of the FIG. 1 embodiment.
Figure 5B:
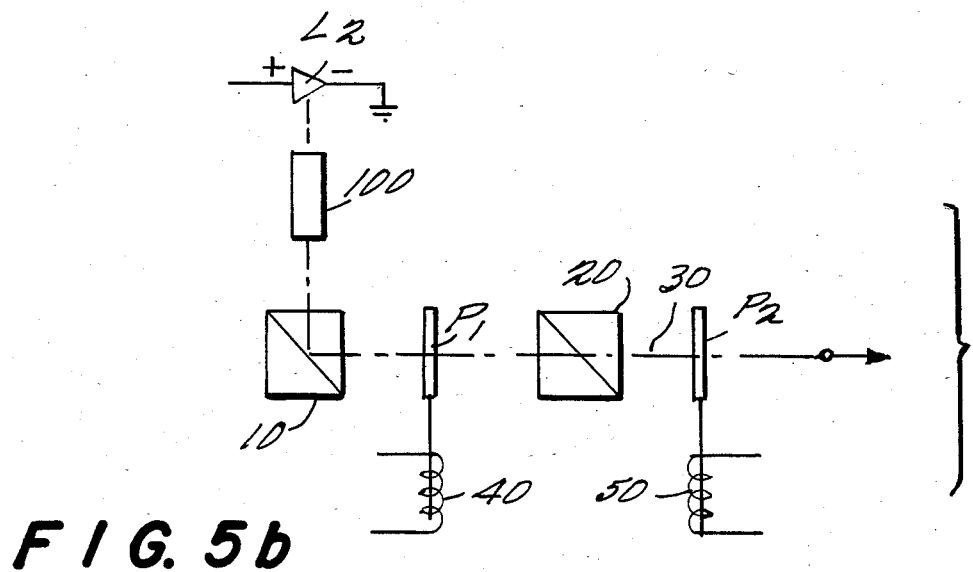
Figure 5C:
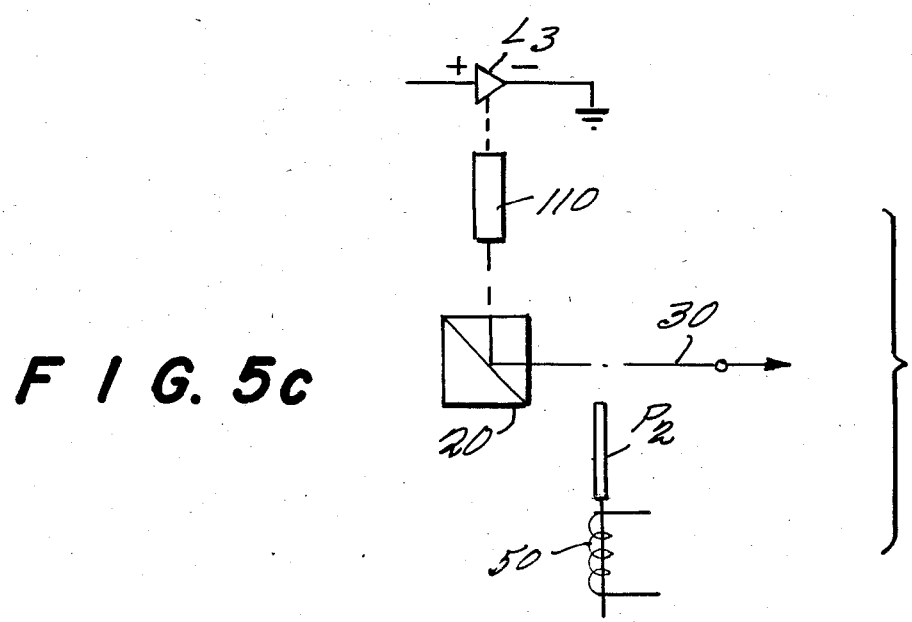

In FIGS. 5(a)-5(c), an alternative arrangement is depicted providing horizontally polarized system output. Here, when laser L1 is energized, solenoid 50 is also energized so that half-wave plate P2 extends into optical path 30. Thus, vertically polarized output from laser L1 is passed through collimating means 90, through PBS 10 and PBS 20 and half-wave plate P2 where it is rotated by 90° to provide a horizontally polarized output.

In FIG. 5(b), laser L2 is energized along with both solenoids 40 and 50. Thus, horizontally polarized output from laser L2 is passed through collimating means 100, reflected by PBS 10, rotated by 90° upon passage through half-wave plate P1 (so that it can be transmitted through PBS 20), and then further rotated by 90° upon passage through the half-wave plate P2 to provide a horizontally polarized output.

In FIG. 5(c), only laser L3 is energized and half-wave plates P1 and P2 are retracted out of optical path 30. Under these conditions, horizonally polarized output from laser L3 is passed through collimating means 110 and reflected by PBS 20 to become the horizontally polarized light output.

Figure 3:
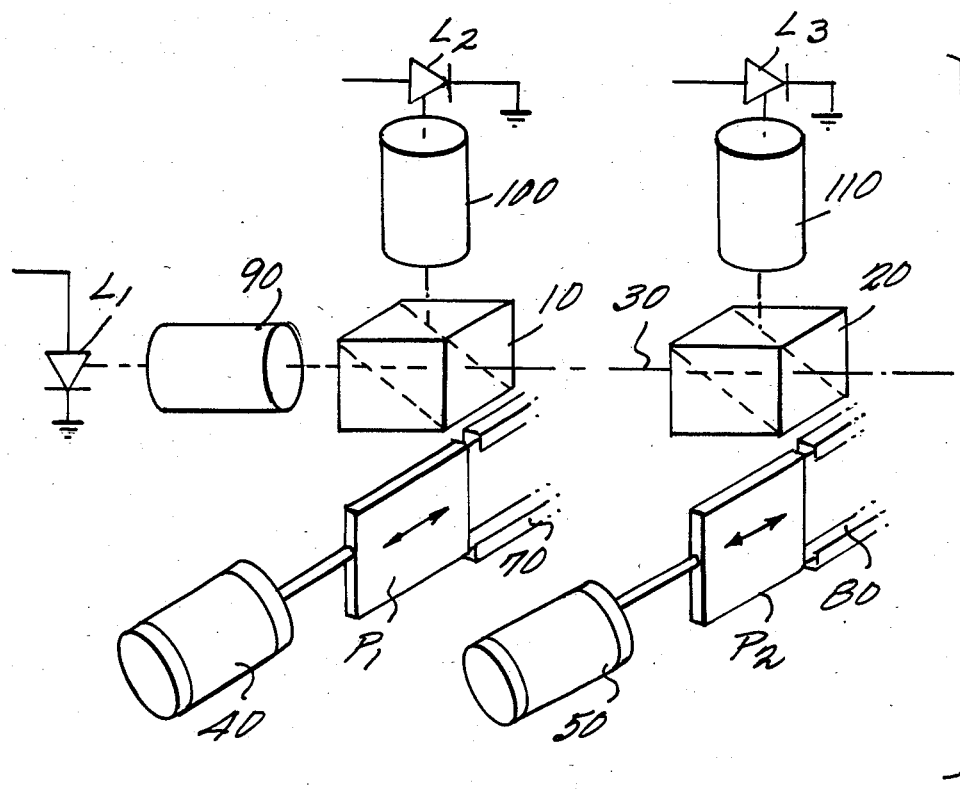
FIG. 3 is a perspective, less schematic view of the FIG. 1 embodiment.

As mentioned above, a distinct advantage of the present invention over prior laser switching systems is that the only required mechanical optical switching motions do not require precise mechanical alignments (once the system components have been initially aligned and secured). In the perspective view shown in FIG. 3, the lasers, collimating means and polarizing beam splitters show are all fixed with the only movable elements being half-wave plates P1 and P2, which are merely translated into and out of the optical path 30 by means of solenoids 40 and 50 and by means of track guiding means 70 and 80. The track guiding means 70 and 80 can be comprised of rails containing ball bearings or other suitable means for easily sliding the half-wave plates into and out of the optical path 30. Thus, once the half-wave plates have been cut with the proper relative rotational orientation and aligned with their respective track guiding means 70, 80, the sensitivity of the system to inaccurate mechanical movements during operation is minimized. Furthermore, because the half-wave plates are alignment sensitive only in rotation, and are insensitive to centration and tip-tilt, once they have been initially aligned in their only critical parameter, namely, rotation, system alignment insensitivity to translational motion artifacts is obtained.

While a specific exemplary embodiment has been described in detail, numerous changes, modifications and variations may be made without departing from many of the novel advantages and features of the invention. Accordingly, all such changes, modifications and variations are intended to be covered by the following claims.

What is claimed is:

1. A laser switching system having an output optical path and including a plurality of lasers each of which produces linearly polarized light, said switching system comprising:
   means disposed in said output optical path for receiving linearly polarized light from said lasers and for passing said received laser light outwardly along said output optical path;
   at least one beam rotating means for receiving linearly polarized light and passing same after rotation of its polarization vector by a predetermined angle; and
   drive means for selectively moving said beam rotating means into and out of said output optical path.

2. A switching system as claimed in claim 1 wherein said first-mentioned means comprises at least one polarizing beam splitter and wherein one of said lasers is oriented at a predetermined angle with respect to another one of said lasers.

3. A switching system as claimed in claim 1 wherein said beam rotating means comprises at least one half-wave plate.

4. A laser switching system comprising:
   a plurality of lasers capable of providing linearly polarized laser light;
   a plurality of polarizing beam splitters, each arranged to receive linearly polarized laser light from at least one of said plurality of lasers and to output a corresponding linearly polarized laser light beam along an optical path;
   a plurality of half-wave plates, each disposed downstream of a corresponding beam splitter along said optical path for receiving a linearly polarized laser light beam passing therealong and for outputting a linearly polarized laser light beam rotated by substantially 90°; and
   drive means for selectively moving each of said plurality of plates into and out of said optical path.

5. A multi-laser switch system comprising:
   a plurality of semiconductor diode laser light sources, each being fixedly mounted with respect to an optical output path of said switch system and each capable of producing a linearly polarized light output when activated;
   A plurality of polarizing beam splitters, each being fixedly mounted in sequence along said optical output paths, each beam splitter being disposed to receive the light output from at least one of said laser light sources when such source is activated and to pass such laser light output downstream along said optical output path; and
   a plurality of half-wave plates, each being movably mounted in sequence downstream of a respectively corresponding one of the beam splitters along said optical output path and capable of being selectively moved into and out of said optical output path.

6. A multi-laser switch system as in claim 5 further comprising:
   a plurality of laser shaping and collimating optics, each being fixedly mounted in the light output path of a respectively corresponding one of said lasers.

7. A multi-laser switch system as in claim 5 further comprising:
   a plurality of electro-mechanical transducers, each connected to a respective one of said half-wave plates for physically moving it in response to electrical activation; and
   a coordinated electrical control means connected to said plurality of laser light sources and to said plurality of electro-mechanical transducers for selectively activating predetermined one(s) of said laser light sources and said transducers so as to maintain a predetermined direction of linearly polarized laser light output from the multi-laser switch system regardless of which laser light source is activated.

8. A multi-laser switch system as in claim 7 wherein each of said electro-mechanical transducers produces substantially only translational motion.

9. A multi-laser switch system having an optical output path and comprising:
   first and second selectively activated lasers fixedly secured with respect to one another in a predetermined orthogonal orientation such that vertically polarized light is output from the first laser with respect to horizontally polarized light output from the second laser;
   a polarizing beam splitter fixedly secured with respect to said lasers and disposed to respectively transmit and reflect the polarized outputs from said first and second lasers outwardly along said optical output path; and
   a half-wave plate mounted downstream of said beam splitter along said optical output path for translational motion into and out of said optical output path to convert said horizontally polarized reflected light to vertically polarized light passing on down the optical output path.

10. A multi-laser switch system as in claim 9 further comprising:
    a third selectively activated laser fixedly secured with respect to said first and second lasers and oriented in polarization alignment with said second laser to produce horizontally polarized light output when activated;
    a second polarizing beam splitter also fixedly disposed with respect to said lasers and with respect to the first-mentioned beam splitter downstream thereof along said optical output path and being disposed (1) to reflect the horizontally polarized output from said third laser outwardly along said optical output path and (2) to transmit vertically polarized light input thereto along said optical output path; and
    a second half-wave plate mounted downstream of said second beam splitter along said optical output path for translational motion into and out of said optical path to convert horizontally polarized reflected light to vertically polarized light passing on downstream the optical output path.

11. A multi-laser switch system as in claim 9 further comprising:
    first light beam collimation means fixedly secured with respect to the output of said first laser; and
    second light beam collimation means fixedly secured with respect to the output of said second laser.

12. A multi-laser switch system as in claim 10 further comprising:
   first light beam collimation means fixedly secured with respect to the output of said first laser;
   second light beam collimation means fixedly secured with respect to the output of said second laser; and
   third light beam collimation means fixedly secured with respect to the output of said third laser.

13. A laser switching system including a plurality of lasers arranged to be selectively energized for transmitting linearly polarized laser light along an optical path, said switching system comprising:
   a first polarizing beam splitter (1) disposed in said optical path for receiving and passing laser light along said optical path from a first one of said lasers when said first laser produces light linearly polarized in a first predetermined direction and (2) for receiving and reflecting laser light along said optical path from a second one of said lasers when said second laser produces light linearly polarized in a second predetermined direction;
   a first half-wave plate movable between a first position in said optical path and a second position out of said optical path, said first half-wave plate being capable of rotating laser light (1) from said second predetermined direction of linear polarization to said first predetermined direction of linear polarization and (2) from said first predetermined direction of linear polarization to said second predetermined direction of linear polarization;
   a second polarizing beam splitter disposed in said optical path for receiving and passing laser light along said optical path emanating from said first and second lasers when linearly polarized in said first predetermined direction and for reflecting laser light along said optical path from a third one of said lasers when said third laser produces light linearly polarized in said second predetermined direction;
   a second half-wave plate movable between a first position in said optical path and a second position out of said optical path, said second half-wave plate being capable of rotating laser light (1) from said second predetermined direction of linear polarization to said first predetermined direction of linear polarization and (2) from said first predetermined direction of linear polarization to said second predetermined direction of polarization; and
   drive means for selectively and independently moving said first and second half-wave plates into their respective said first and second positions in accordance with which one of said plurality of lasers is energized to produce a switching system output laser light linearly polarized in one of said first and second predetermined directions.

14. A switching system as claimed in claim 13, wherein said drive means causes (1) said first and second half-wave plates to be in their said second positions when said first laser is energized, (2) said first half-wave plate to be in its said first position and said second wave plate to be in its said second position when said second laser is energized, and (3) said second half-wave plate to be in its said first position when said third laser is energized.

15. A switching system as claimed in claim 13, wherein said drive means causes (1) said first half-wave plate to be in its said second position and said second half-wave plate to be in its said first position when said first laser is energized, (2) said first and second half-wave plates to be in their said first positions when said second laser is energized, and (3) said second half-wave plate to be in its said second position when said third laser is energized.

* * * * *